(12) United States Patent
Mukawa

(10) Patent No.: US 6,252,842 B1
(45) Date of Patent: Jun. 26, 2001

(54) DISC FOR RECORDING INFORMATION SIGNALS AND DISC CHUCKING DEVICE

(75) Inventor: Hiroshi Mukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/434,029

(22) Filed: May 3, 1995

Related U.S. Application Data

(63) Continuation of application No. 08/195,976, filed on Feb. 10, 1994, now abandoned, and a continuation of application No. 07/833,927, filed on Feb. 11, 1992, now abandoned.

(30) Foreign Application Priority Data

Feb. 12, 1991 (JP) .................................................. 3-040965
Jul. 12, 1991 (JP) .................................................. 3-198857

(51) Int. Cl.$^7$ .................................................. G11B 23/00
(52) U.S. Cl. .................................................. 369/270; 369/291
(58) Field of Search .................................................. 369/270, 282, 369/291, 271, 290; 360/133, 99.05

(56) References Cited

FOREIGN PATENT DOCUMENTS

26880 * 4/1981 (EP) .................................................. 369/282
0099005 * 1/1984 (EP) .................................................. 360/99.05

* cited by examiner

Primary Examiner—David L. Ometz
Assistant Examiner—Tianjie Chen
(74) Attorney, Agent, or Firm—Oblon, Spivak, McClelland, Maier & Neustadt, P.C.

(57) ABSTRACT

A recording disc for use with a disc recording and reproducing apparatus of the type having a disc chucking device which includes a spring biased, conically shaped centering member mounted coaxially on a drive spindle, wherein the disc includes a disc substrate contained in a cartridge and having a center hole which has a diameter smaller than a base diameter of the conically shaped centering member, an annular rib which depends from a lower surface of the disc substrate toward the disc chucking device for seating on a disc setting member and which enlarges the thickness of the disc substrate, in the direction of the axis of rotation of the spindle, around the periphery of the center hole so that the centering member can have a steeper slope compared to prior art centering members, and thereby provide more effective centering action, and yet when the disc substrate is supported by the annular rib on the disc setting member no part of the disc chucking device extends through the center hole of the disc substrate above its upper surface.

4 Claims, 6 Drawing Sheets

US 6,252,842 B1

DISC FOR RECORDING INFORMATION SIGNALS AND DISC CHUCKING DEVICE

This is a continuation of application Ser. No. 08/195,976 filed on Feb. 10, 1994, now abandoned, and it is a continuation of application Ser. No. 07/833,927 filed Feb. 11, 1992, now abandoned.

BACKGROUND OF THE INVENTION

1. Field of the Invention

This invention relates to a recording disc for information signals, such as an optical disc or a magneto-optical disc, and a disc chucking apparatus for chucking the recording disc to a disc recording and/or reproducing apparatus.

2. Description of Related Art

A recording disc for recording and/or reproducing information signals, such as an optical disc or a magneto-optical disc, has heretofore been known and put to practical use. Referring to FIG. 1, the recording disc includes a disc substrate 201, formed of a light-transmitting material, such as polycarbonate resin, and a recording layer, such as a layer of a metal or a magnetic material, is deposited on a major surface of the disc substrate 201. A light beam is irradiated on the other major surface of the substrate, that is the major surface thereof opposite to the surface on which the recording layer is deposited for recording or reproducing the information signals on or from the recording layer.

The disc substrate 201 is formed with a center hole 202 to permit the disc to be held by a recording and/or reproducing apparatus adapted for recording and/or reproducing the information signals on or from the recording disc. The center hole 202 is formed in the disc substrate 201 so that the center of the center hole 202 is in register with the center of curvature of recording track(s) formed concentrically or spirally on the recording layer.

The recording disc is set on a disc table 204 in the recording and/or reproducing apparatus. The disc table 204 is in the form of a disk larger in diameter than the center hole 202 and is mounted on the distal end of a shaft 203 of a spindle motor, not shown. A setting portion 204a, on which the disc substrate 201 of the recording disc is set, is formed on the upper peripheral surface of the disc table 204, that is on the major surface of the disc table 204 situated in the direction of projection of the distal end of the driving shaft 203.

A centering member 205 is reciprocably mounted at the center of the disc table 204. The centering member 205 is in the form of a cone gradually tapered towards the distal end of the rotating shaft 203 and has an outside diameter substantially corresponding to the diameter of the center hole 202. The centering member 205 is elastically biased in the direction of the distal end of the rotating shaft 203 by a compression coil spring, not shown.

When loaded in the recording and/or reproducing apparatus, the recording disc is set on the disc table 204 and is thrust, by a chucking unit, not shown, towards the disc table 204, so that the mid part of the major surface of the disc is abutted against the setting portion 204a. That is, with the recording and/or reproducing apparatus, a so-called self alignment or centering operation is achieved by the inner periphery of the center hole 202 sliding on the outer peripheral surface of the centering member 205.

The recording disc may be self-aligned in this manner even if it is offset with respect to the centering member 205 by a distance corresponding to the width of the outer peripheral surface 205a of the centering member 205 along the major surfaces of the disc substrate 201, as indicated by dimension b in FIGS. 1 and 2, as disclosed for example in U.S. Pat. No. 4,340,955.

If, in the recording and/or reproducing apparatus, the recording disc is to be held more reliably and satisfactorily, the self-alignment or centering operation needs to be achieved even if the amount of offset of the recording disc with respect to the centering member 205 is increased when the recording disc is set on the disc table 204. To this end, the width of the outer peripheral surface 205a of the centering member 205 along the major surface of the disc substrate 201 needs to be increased.

However, if the width of the outer peripheral surface 205a of the centering member 205 along the major surface of the disc substrate 201 is increased in this manner, the slant of the outer peripheral surface 205a with respect to the major surfaces of the disc substrate 201 becomes more gentle, so that the inner peripheral surface of the center hole 202 becomes more difficult to slide along the outer peripheral surface 205a. The result is that the amount of shifting of the disc for centering is insufficient so that a satisfactory self-alignment or centering is not achieved.

Thus, for achieving satisfactory self-alignment, it is necessary to increase the width of the outer peripheral surface 205a in a direction along the major surfaces of the disc substrate 201, while maintaining the slant of the surface 205a with respect to the major surfaces of the disc substrate 201. To this end, it is necessary to increase the height, shown by an arrow h in FIG. 2, of the surface 205a in a direction normal to the major surfaces of the disc substrate 201.

If the height of the surface 205a in the direction normal to the major surfaces of the disc substrate 201 is increased, the centering member 205 is protruded on the major surface of the disc substrate 201 opposite to the disc table setting major surface via the disc substrate when the disc is set on the disc table 204. If the centering member 205 is protruded in this manner on the major surface of the disc substrate opposite to the disc table setting major surface when the disc is held by the recording and/or reproducing apparatus, the disc rotating unit inclusive of the disc table is increased in height, so that the recording and/or reproducing apparatus is correspondingly increased in size.

On the other hand, when the recording disc is housed in a thin casing-like disc cartridge, there is a risk of the centering member 205 being abutted against the inner surface of a cartridge body of the disc cartridge when the recording disc is loaded on the disc table 204. In order for the centering member 205 not to be protruded towards the major surface of the disc substrate 201 opposite to the disc table setting major surface to thereby avoid the contact of the centering member with the inner surface of the cartridge body, the cartridge body needs to be increased in size, thus leading to an increased size of the disc cartridge.

OBJECT AND SUMMARY OF THE INVENTION

It is an object of the present invention to provide a recording disc which may be loaded reliably and satisfactorily on the disc table without increasing the size of the recording and/or reproducing apparatus and without increasing the size of the disc cartridge when the disc is used in conjunction with the disc cartridge.

It is another object of the present invention to provide a chucking device which is conceived for assuring correct centering of the recording disc.

A recording disc according to the present invention for use with a disc recording and reproducing apparatus of the type having a disc chucking device which includes a spring biased, conically shaped centering member mounted coaxially on a drive spindle, comprises a disc substrate contained in a cartridge and having a recording surface, a center hole which has a diameter smaller than a base diameter of the conically shaped centering member, and an annular rib which depends from a lower surface of the disc substrate toward the disc chucking device for seating on a disc setting member and which enlarges the thickness of the disc substrate, in the direction of the axis of rotation of the spindle, around the periphery of the center hole. Because of this, the centering member can have a steeper slope compared to prior art centering members, and thereby provide more effective centering action, and yet when the disc substrate is supported by the annular rib on the disc setting member no part of the disc chucking device extends through the center hole of the disc substrate above its upper surface.

Another aspect of the invention is the combination of a recording disc and a disc recording and reproducing apparatus for recording signals on the disc and reproducing signals from the disc, the combination comprising:

a disc chucking device which includes a motor driven spindle, a disc setting member mounted for rotation with the spindle for supporting the disc when the disc is chucked by the disc chucking device, and a resiliently biased, conically shaped centering member mounted coaxially on the spindle with the disc setting member for reciprocal movement along the length of the spindle;

a disc substrate having a recording surface and a center hole which has a diameter smaller than a base diameter of the conically shaped centering member;

a cartridge for containing the disc substrate, the cartridge having access holes for one or more recording heads, and the disc chucking device; and wherein the disc further includes an annular rib which depends from a lower surface of the disc substrate toward the disc chucking device for seating on the disc setting member and which enlarges the thickness of the disc substrate, in the direction of the axis of rotation of the spindle, around the periphery of the center hole, and wherein the thickness of the annular rib is sufficient that when the disc substrate is supported by the annular rib on the disc setting member no part of the disc chucking device extends through the center hole of the disc substrate to project above an upper surface of the disc substrate which is parallel to the lower surface of the disc substrate.

Preferably a magnetic member is positioned in register with the center hole in a recessed portion in the upper surface of the disc substrate so that the magnetic member closes the center hole and an upper surface of the magnetic member is substantially flush with the upper surface of the disc substrate. A magnet is mounted on the spindle, radially inwardly of the centering member for magnetically attracting the magnetic member. A coil spring mounted coaxially about the spindle presses the centering member away from the disc setting member and toward the magnetic member.

Because of the relatively thick hub, as compared to the thickness of the disc substrate, the centering member can have a conical surface having a slope of at least 51° for contacting a lower, radially interior edge of the annular rib for more effectively coaxially centering the disc substrate about the spindle compared to prior art such devices while, at the same time, not increasing the thickness of the disc drive or the cartridge.

Other objects and advantages of the present invention will become more apparent from the following description.

DESCRIPTION OF THE PREFERRED EMBODIMENTS

Figure 1:
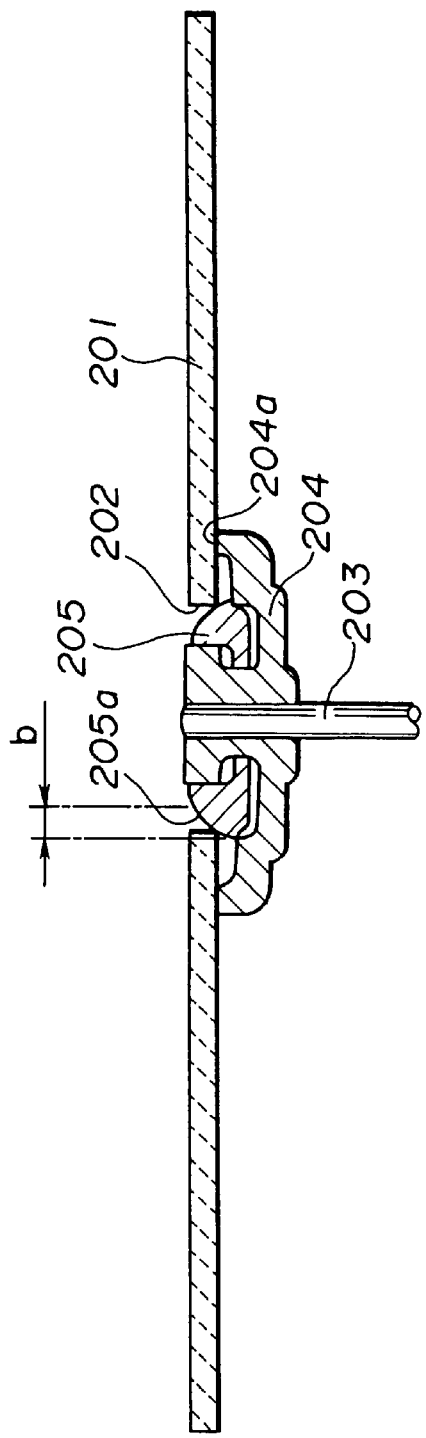
FIG. 1 is a longitudinal cross-sectional view showing a conventional recording disc and a conventional chucking device for holding the disc.
Figure 2:
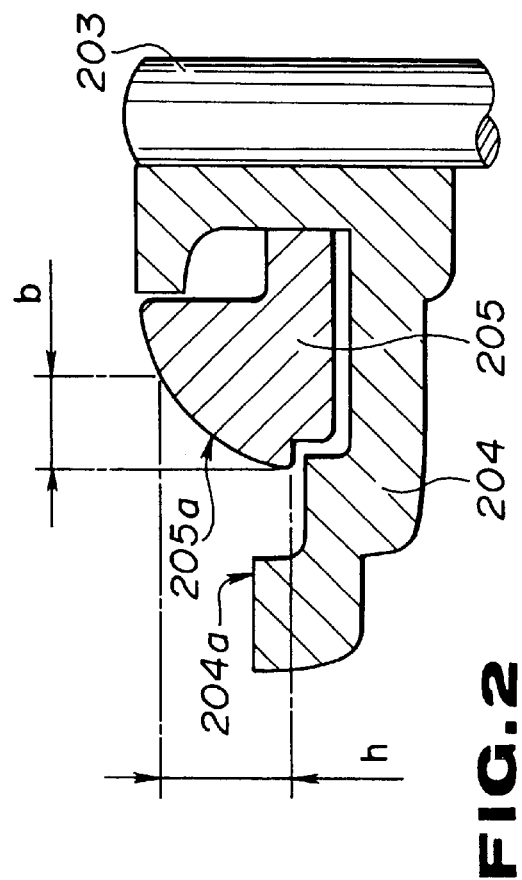
FIG. 2 is a longitudinal cross-sectional view showing essential parts of the recording disc and the disc chucking device shown in FIG. 1.

Referring to the drawings, preferred embodiments of the present invention will be explained in detail.

The following embodiments illustrate preferred arrangements in which the recording disc according to the present invention is a so-called magneto-optical disc which is housed in the disc cartridge.

Figure 3:
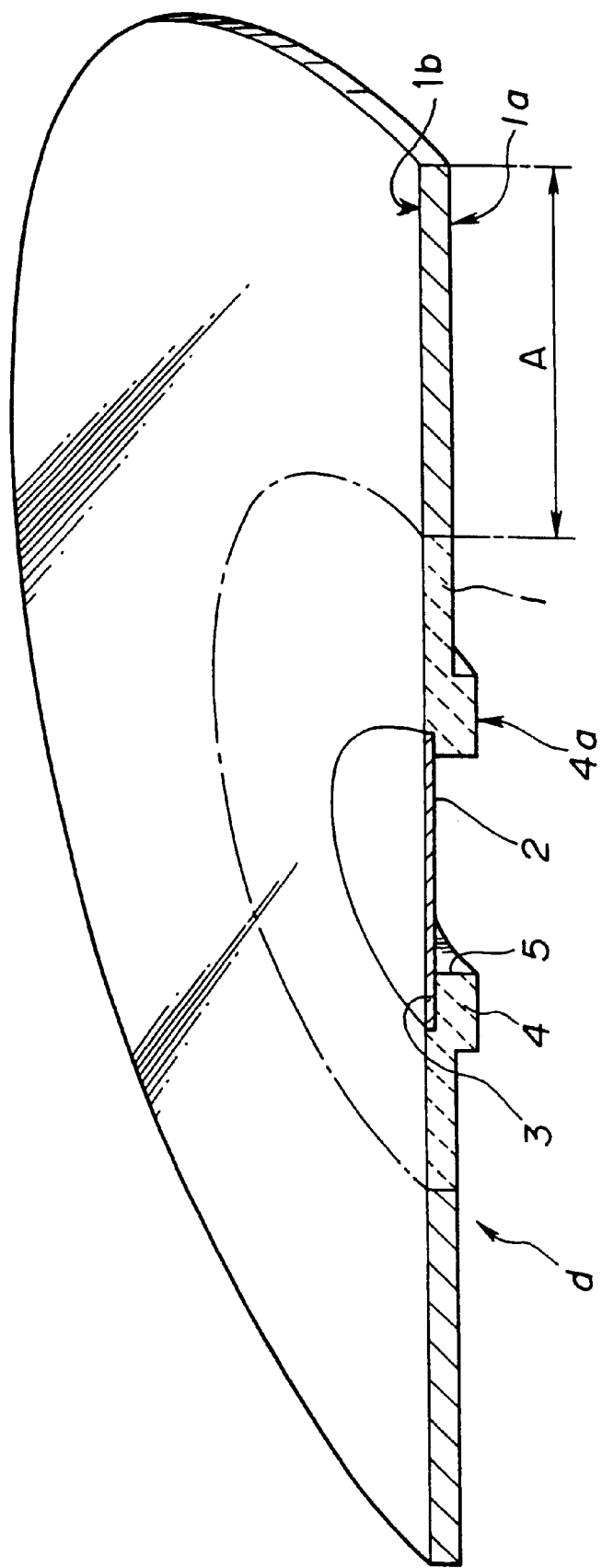
FIG. 3 is a perspective view showing a recording disc according to an embodiment of the present invention, with a portion thereof being broken away.

FIGS. 3 et seq. show a first embodiment of a recording disc d of the present invention. Referring to FIG. 3, the recording disc d includes a disc substrate 1 which is formed of light-transmitting synthetic resin, such as polycarbonate, in the form of a disc. One of the major surfaces of the disc substrate 1 is designed as a signal recording surface 1a (i.e. a surface on which a laser beam is incident) on or from which information signals are written or read by a recording and/or reproducing apparatus. On the other major surface of the disc substrate 1, i.e. surface 1b, there is deposited a recording layer of a magnetic material, such as by vapor deposition, sputtering or the like, in the form of a thin film. When reading information signals from the recording layer, a light beam emitted from an optical head of the disc recording and/or reproducing apparatus is irradiated through the disc substrate 1 on the recording layer and the light reflected from the recording layer is received by a photodetector of the optical head for reproducing information signals recorded on the recording disc d. When recording the information signals on the disc d, since the recording disc d is the magneto-optical disc, the light beam is irradiated by the optical head through the disc substrate 1, at the same time that a magnetic field modulated in accordance with the information signals to be recorded is supplied by an external magnetic field generator of the disc recording and/or reproducing apparatus.

Meanwhile, a region of a predetermined width of the recording layer towards the outer rim of the disc substrate 1, as shown by arrow A in FIG. 3, is a signal recording region. The disc substrate 1 has a constant thickness of the order of 1.2 mm, as shown by dimension T in FIG. 4.

The disc substrate 1 is formed with a center hole 5 in order for the disc substrate 1 to be held by the disc recording and/or reproducing apparatus. A disc-shaped member 2 is mounted within the center hole 5. The center hole 5 is a circular through-hole having its center in register with the center of curvature of the spiral or concentric recording track(s) formed on the recording layer. The disc-shaped member 2 is formed of metal or the like magnetic material and is slightly larger in diameter than the center hole 5. The disc-shaped member 2 is mounted on the major surface of the disc substrate 1 bearing the recording layer for closing the center hole 5 so that the center of the member 2 is substantially in register with the center of the center hole 5. The disc-shaped member 2 has a constant thickness of the order of 0.2 mm in the present embodiment.

The major surface 1b of the disc substrate 1 bearing the recording layer is formed with a circular recess 3 extending along the rim of the center hole 5 for receiving the disc-shaped member 2. The recess 3 has a diameter and a depth corresponding to the diameter and thickness of the disc-shaped member, respectively. Thus the disc-shaped member 2 has its upper major surface, that is its major surface opposite to its major surface abutted by the disc substrate 1, substantially flush with the major surface 1b of the disc substrate 1 bearing the recording layer.

The major surface 1a of the disc substrate 1 not bearing the recording layer is formed with an annular rib 4 having a flat end face extending around the center hole 3. The rib 4 is formed as one with the disc substrate 1. The rib 4 has an inside diameter substantially equal to the diameter of the center hole 5 and is substantially coaxial with the center hole 5.

Figure 6:
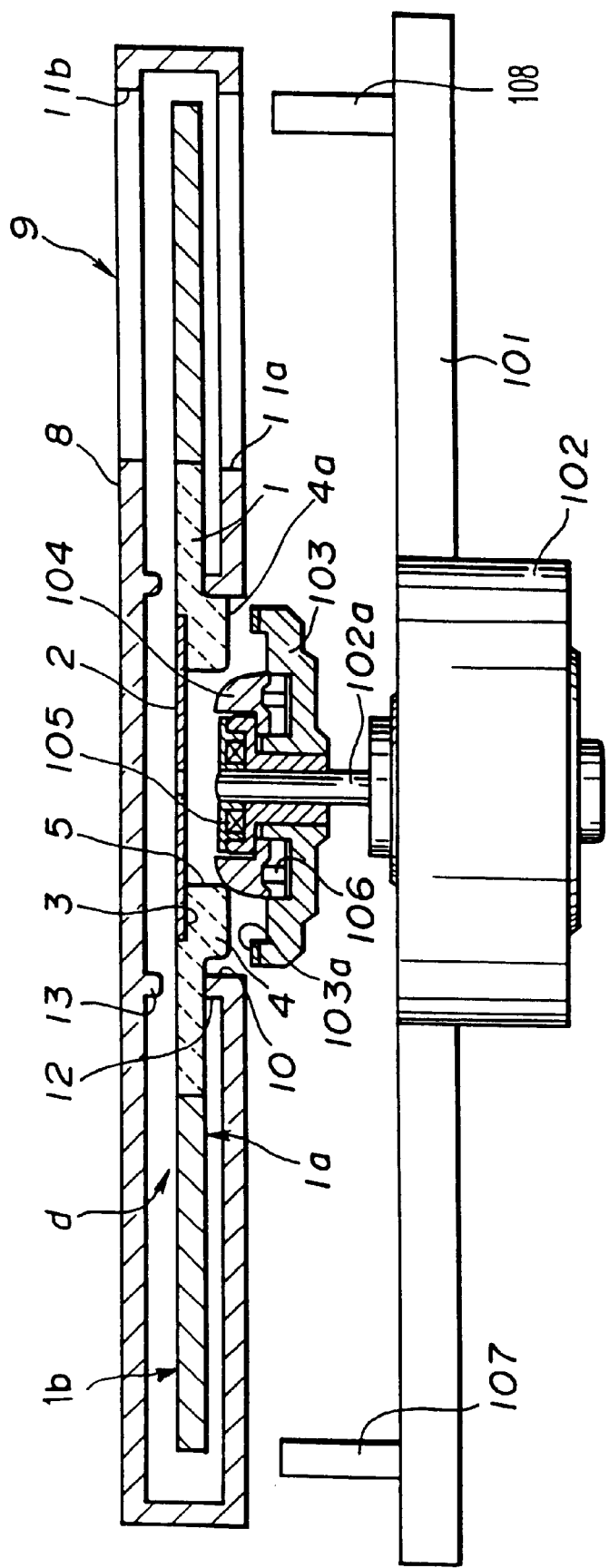
FIG. 6 is a longitudinal cross-sectional view showing a disc cartridge having the disc shown in FIG. 5 housed therein, with the disc cartridge being shown in the state in which it is being held by the associated disc chucking device.
Figure 7:
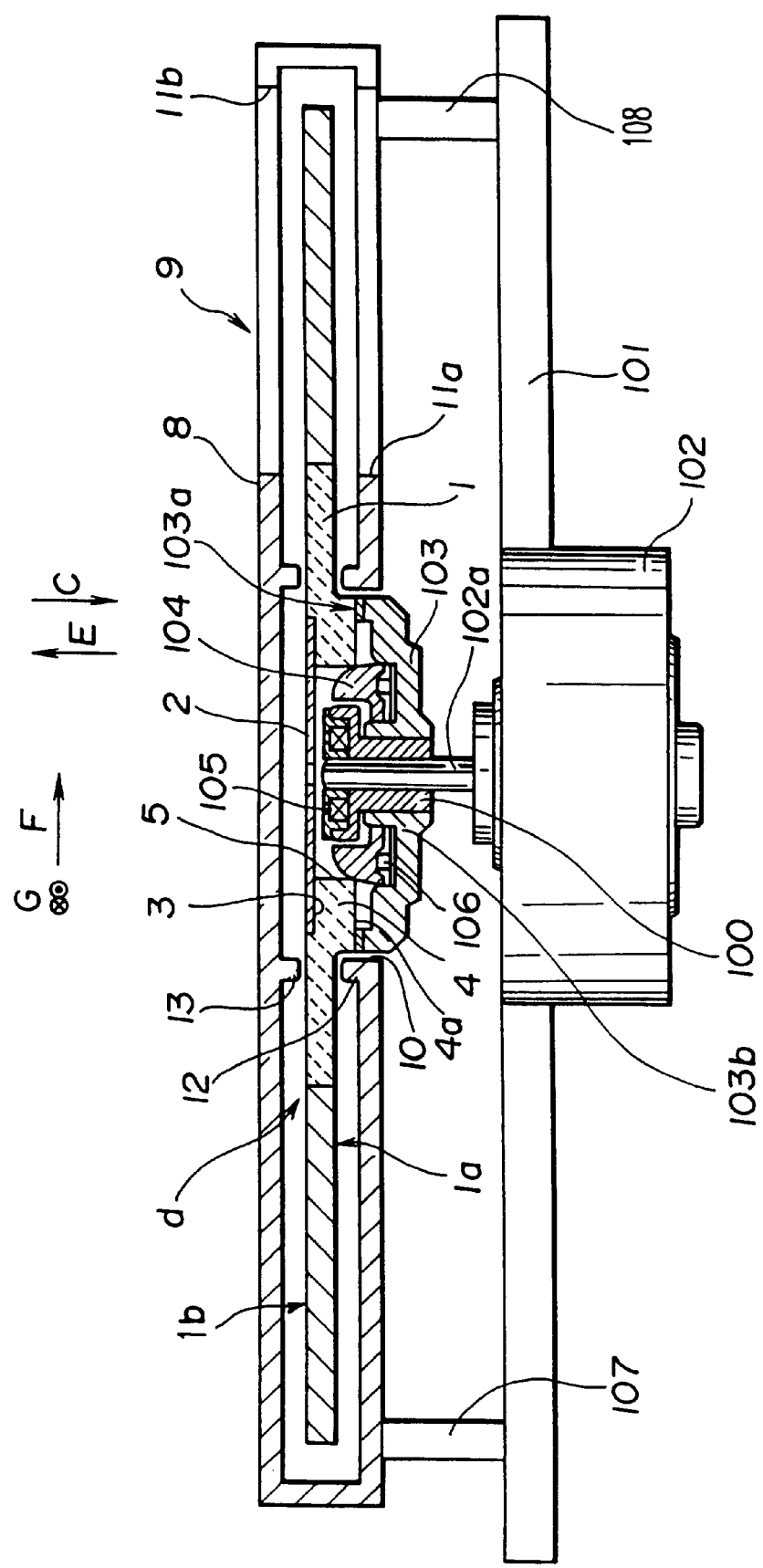
FIG. 7 is a longitudinal cross-sectional view showing the disc cartridge of FIG. 6 in the state in which it is completely held by the associated disc chucking device.

Referring to FIGS. 6 and 7, the recording disc d is accommodated in a cartridge body 8 of a disc cartridge 9. The cartridge body 8 is in the form of a thin casing for accommodating the recording disc d therein and has a thickness larger than the thickness of the disc substrate 1 and a plan shape substantially in the form of a square having its side slightly larger than the diameter of the disc substrate 1. The lower major surface of the cartridge body 8 has a central chucking aperture 10. The aperture 10 is circular to permit the rib 4 and the center hole 5 to be exposed to outside. The upper and lower major surfaces of the cartridge body 8 are formed with recording/reproducing apertures 11b, 11a, respectively. These apertures 11a, 11b are formed as substantially square through-holes and extended from the vicinity of the chucking aperture 10 to the vicinity of a lateral side of the cartridge body 8 to permit the signal recording surface 1a of the disc 1 to be exposed to outside across the inner and outer peripheries of the disc d. The light beam from the optical head is irradiated on the recording disc d via the recording/reproducing aperture 11a in the lower major surface of the cartridge body 8, at the same time that an external magnetic field is supplied from the external magnetic field generator via the recording aperture 11b formed in the upper major surface of the cartridge body 8.

The lower inner side and the upper inner side of the cartridge body 8 are formed with ribs 12 and 13, respectively. The rib 12 is formed as one with the inner surface of the cartridge body 8 for facing the major surface 1a of the disc substrate 1 not bearing the recording layer, whilst the rib 13 is formed as one with the inner surface of the cartridge body 8 for facing the major surface 1b of the disc substrate bearing the recording layer. These ribs 12, 13 are abutted on the outer surfaces of the disc 2 and the rib 4 for preventing the major surfaces 1a, 1b of the disc from being contacted with the inner lateral surfaces of the cartridge body 8.

When in use, the recording disc is set on a disc table 103 mounted on the distal end of the rotating shaft 102a of a spindle motor 102 of disc recording/reproducing apparatus. The spindle motor 102 is secured to a chassis 101 of the disc recording and/or reproducing apparatus.

The disc table 103 is of a diameter larger than the diameter of the center hole 5 of the recording disc d and approximately equal to the outside diameter of the rib 4 of the recording disc d. The disc table 103 is mounted on the rotating shaft 102(a) of the spindle motor 102 by a mounting member 100 (see FIG. 4) adapted for mounting a magnet 105 adapted in turn for attracting the disc-shaped member 2, so that the plane formed by a setting portion 103a of the disc table 103 is normal to the rotating shaft 102. The disc table 103 is rotated in unison with the rotating shaft 102a when the shaft 102a is rotated. The disc table 103 is made up of a cylindrical portion 103b directed to the inner periphery of the disc table 103 for attachment to the mounting member 100, a setting portion 103a directed to the outer periphery of the disc table 103 and providing a flat circular setting surface and a recessed connecting portion 103c interconnecting the portions 103a and 103b. The setting portion 103a, the cylindrical portion 103b and the connecting portion 103c of the disc table 103 are formed integrally from synthetic resin or a metallic material.

On the disc table 103, a centering member 104 for centering the recording disc d set on the setting portion 103a is mounted coaxially with respect to the rotating shaft 102a, mounting member 100 and the disc table 103. This centering member 104 is biased at all times in a direction towards the distal end of the rotating shaft 102a, as shown by arrow E in FIG. 7, by a compression coil spring 106 arranged between the connection portion 103c of the disc table 103 and the centering member 104.

The centering member 104 is substantially in the shape of a frustum of a cone with an upper side thereof towards the distal end of the rotating shaft 102a having a smaller diameter than the diameter of the lower bottom side thereof faced by the connection portion 103c of the disc table 103. The centering member 104 is mounted coaxially with respect to the disc table 103 for performing a sliding reciprocation with respect to the cylindrical portion 103b of the disc table 103. The upper and lower limit amounts of displacement of the centering member 104 are determined by a magnet mounting portion 100b at the upper end of the magnet mounting member 100 and by the length of the compression spring 106 disposed within the connecting portion 103c of the disc table 103. The centering member 104 is slid between these upper and lower limit positions depending on the setting operation of the disc table 103.

The mounting member 100 is comprised of a tubular portion 100a fitted to the rotating shaft 102a of the spindle motor 102 and the flanged magnet mounting portion 100b on one end of the tubular portion 100a, these portions 100a and 100b being formed from metal or the like material as one with each other. The outer periphery of the magnet mounting portion 100b is formed with an upright wall portion for forming a mounting recess for mounting an annular magnet 105.

The upper surface of the magnet 105, placed within the recess of the magnet mounting portion 100b, is covered with a cover member 99.

When the disc cartridge 9 is loaded in position on the chassis 101 within the disc recording and/or reproducing apparatus, as shown in FIG. 6, the lower rim of the center hole 5 of the recording disc d, that is the inner edge of the rib 4, is abutted by the outer peripheral surface of the centering member 104. When the cartridge body 8 is moved further towards the chassis 101, that is in the descending direction, the cartridge body 8 is abutted against the ends of upright positioning pins 107, 108; provided on the chassis 101, as shown in FIG. 7, so that the cartridge body 8 is positioned correctly on the chassis 101 for recording and/or reproduction or rotation of the recording disc d by the spindle motor.

Since the disc-shaped member 2 of the recording disc d is attracted by the magnet 105 arranged on the disc table 103, the centering member 104 is moved towards the proximal end of the rotating shaft 102a, against the bias of the compression coil spring 106. Thus the disc d is set on the disc table 103 with the flattened end face 4a of the rib 4 set on the setting portion 103a.

That is, the flattened end face 4a of the rib 4 functions as a reference plane when setting the recording disc d on the disc table 103. The position along the height of the recording disc d with respect to the disc table 103 is set with the flattened end face 4a as the reference.

The outer peripheral surface of the centering member 104 is abutted against the inner periphery of the center hole 5 under the bias of the compression coil spring 106. Simultaneously, under the force of attraction exerted by the magnet 105 on the disc-shaped member 2 of the recording disc d, the centering member 104 causes the disc substrate 1 to be displaced relative to the disc table 103 in mutually perpendicular directions shown by arrows F and G in FIG. 7 parallel to the major surfaces of the disc substrate 1. By this displacement of the disc substrate 1, the centering operation of bringing the center of the center hole 5 into coincidence with the axis of the centering member 104 is achieved.

In this manner, the disc substrate 1 is loaded by the setting portion 103a of the disc table 103 and the centering member 104 at a predetermined reference position accorded by the disc table 103.

The recording disc d thus loaded in the disc recording and/or reproducing apparatus may be rotated in unison with the disc table 103 which is rotationally driven by the spindle motor 102.

Information signals may be recorded on or reproduced from the recording layer by an optical head, not shown, of the disc recording and/or reproducing apparatus.

The optical head is arranged for facing the signal recording surface 1a and is moved across the inner and outer peripheries of the signal recording surface 1a in register with at least the signal recording region of the disc. The optical head is provided with an objective lens by means of which the light flux is irradiated on the recording layer through the disc substrate 1 for writing and/or reading information signals on or from the recording layer.

Since a magneto-optical disc is used as the recording disc d in the present embodiment, an external magnetic field generator for generating a magnetic field modulated in accordance with information signals is arranged on the opposite side of the recording disc with respect to the optical head adapted for recording information signals on the recording disc d. The modulated magnetic field is supplied by the external magnetic field supplying device to the recording layer heated by the light beam radiated by the optical head for recording information signals on the disc d.

Figure 4:
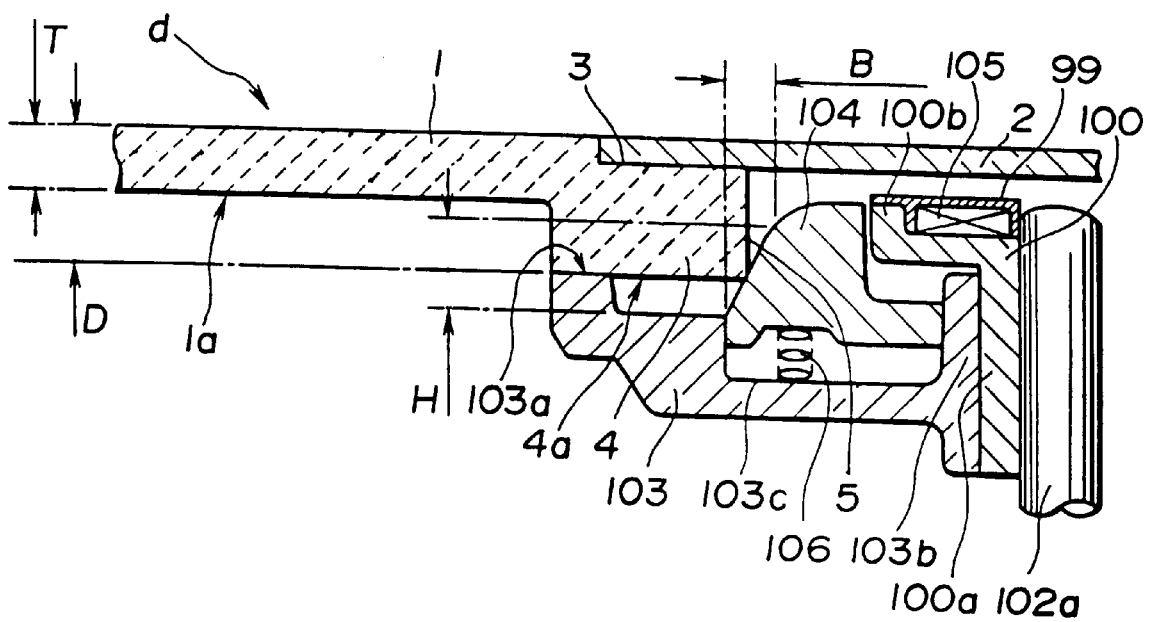
FIG. 4 is a longitudinal cross-sectional view showing essential portions of the recording disc shown in FIG. 3 and a disc chucking device for holding the disc.

With the present recording disc d, the center hole 5 is defined by the rib 4, and the depth of the center hole 5 from the major surface of the disc substrate 1 provided with the recording layer, as indicated by dimension D in FIG. 4, is approximately 2.2 mm. and is deeper than the thickness T of the disc substrate 1 by an amount corresponding to the height of the rib 4,. Thus, with the present recording disc d, the height of the centering member 104 along the axis of the rotating shaft 102a may be increased as compared with that for a conventional recording disc not provided with the rib 4, without increasing the size of the recording and/or reproducing apparatus, while the centering operation of the recording disc d may be facilitated.

That is, with the disc recording and/or reproducing apparatus, in order that a centering operation may be achieved at the time of setting the disc d on the disc table 103 despite a larger offset of the recording disc d with respect to the centering member 104, the effective width of the outer peripheral surface of the centering member 104 along the major surfaces of the disc substrate 1, as indicated by dimension B in FIG. 4, needs to be increased to e.g. 0.8 mm. At this time, with the disc recording and/or reproducing apparatus, in which the recording disc d is used, the effective height of the centering member 104 along the axis of the rotating shaft 102a, as indicated by dimension H in FIG. 4, may be of the order of 1.0 mm. Consequently, with the present disc recording and/or reproducing apparatus, the outer peripheral surface of the centering member 104 may be slanted steeply, at more than 51°, relative to the major surfaces of the disc substrate 1 so that the inner peripheral surface of the center hole 5 may be slid more smoothly relative to the outer peripheral surface of the centering member 104 to assure smooth centering of the recording disc d.

Besides, with the present recording disc d, since the disc substrate 1 is provided with the rib 4, the gap between the rim of the chucking aperture 10 and the disc substrate 1 is stopped by the rib 4 when the recording disc is accommodated in the cartridge body 8 to prevent dust and dirt from being intruded into the interior of the disc cartridge 9.

Figure 5:
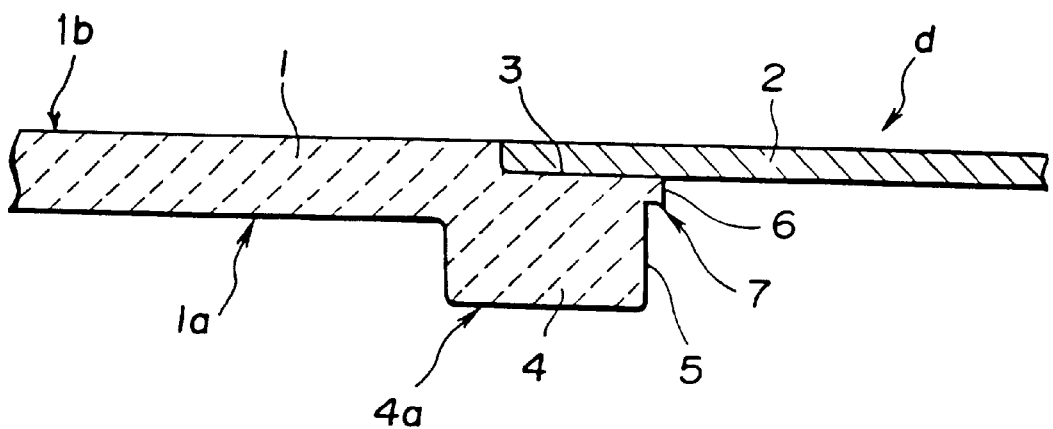
FIG. 5 is a perspective view showing a recording disc according to a second embodiment of the present invention, with a portion thereof being broken away.

A recording disc d according to a second embodiment of the present invention is shown in FIG. 5. The present recording disc d may be so arranged that a burr 7 produced during machining of the center hole 5 in the disc substrate 1 may only be produced in the center hole 5 at a position removed from the flattened end portion 4a of the rib 4, as shown in FIG. 5. That is, when forming the recording disc d, the annular rib 4 is formed at the center of the disc substrate 1 as one with the disc substrate 1, such as by injection molding, and a circular through-hole 6 constituting the center hole 5 is bored on the inner surface of the rib 4. If the diameter of the through-hole 6 is selected to be slightly smaller than the inside diameter of the annulus of the rib 4, the burr 7 is produced within the center hole 5 at a position removed from the end portion 4a of the rib 4. If the recording disc d is arranged in this manner, the shape of the end portion 4a of the rib 4 is not affected by the burr 7, so that an optimum centering operation may be performed by the centering member 104.

Figure 8:
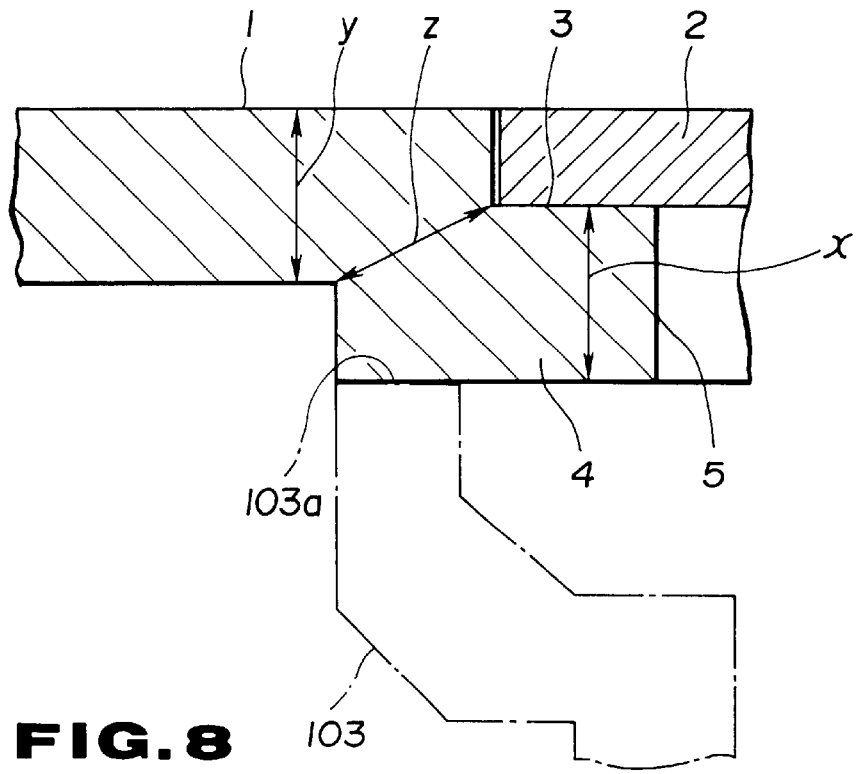
FIG. 8 is a longitudinal cross-sectional view showing a recording disc according to a third embodiment of the present invention, with a portion thereof being broken away.
Figure 9:
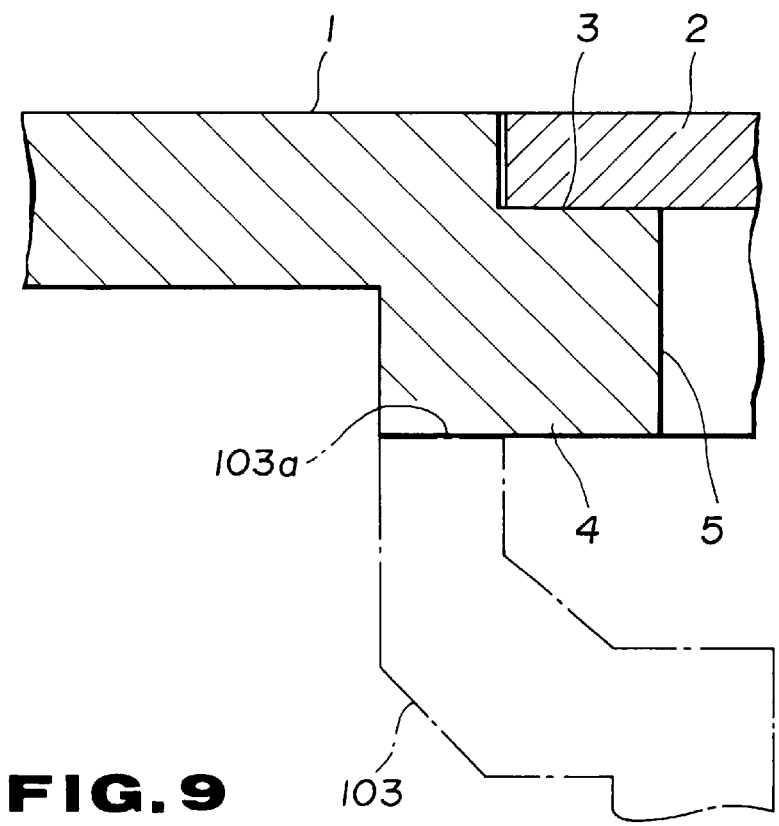
FIG. 9 is a longitudinal cross-sectional view showing a modification of the third embodiment shown in FIG. 8.

Further modifications of the present invention are shown in FIGS. 8 and 9.

FIG. 8 shows a third embodiment of the present invention. In this figure, parts or components which are the same as those shown in the preceding embodiments are indicated by the same reference numerals and detailed description therefor is omitted for simplicity.

With the present recording disc d, a rib 4 is formed integrally at a central portion of one of the major surfaces of a disc substrate 1, such as from a synthetic resin. In this manner, the thickness of a portion around a center hole 5 may be larger than that of the main portion of the disc substrate 1 provided with the signal recording surface 1a. Referring to FIG. 8, by setting the thickness of a portion between the bottom of a recess 3 and the lower end face of the rib 4 (shown as dimension X in FIG. 8) in the portion of the disc substrate 1 provided with the rib 4 so as to be substantially equal to the thickness of the signal recording region of the disc substrate 1 (shown as dimension Y in FIG. 8), it becomes possible to prevent so-called sink which is deformation of an upper surface of a molded product due to shrinkage produced when forming the disc substrate from synthetic resin. Above all, with the recording disc d in which the end portion 4a of the rib 4 is flattened so as to be used as a positioning surface, as shown in FIG. 8, flow of molten resin in a metal mold used for injection molding is smoothed to prevent the sink from being produced at the rib 4.

Meanwhile, if the disc substrate 1 is molded using a molding material less subject to sink, the amount of protuberance of the rib 4 may be increased to increase the wall thickness of the region around the center hole 5 further (as shown in FIG. 9).

If the end portion 4a of the rib 4 cannot be flattened sufficiently, a positioning surface may be provided in a perimetral region of the disc substrate 1 around the rib 4.

It is to be noted that the recording disc according to the present invention is not limited to a magneto-optical disc, but may also be a read-only optical disc in which information signals are pre-recorded in the form of embossed pits or to a write-once type optical disc in which information signals can be recorded only once.

What is claimed is:

1. In combination, a recording disc and a disc recording and reproducing apparatus for recording signals on the disc and reproducing signals from the disc, comprising:

a disc chucking device which includes a motor driven spindle, a disc setting member mounted for rotation with the spindle for supporting the disc when the disc is chucked by the disc chucking device, and a resiliently biased, conically shaped centering member mounted coaxially on the spindle with the disc setting member for reciprocal movement along the length of the spindle;

a disc substrate having a recording surface and a center hole which has a diameter smaller than a base diameter of the conically shaped centering member;

a magnetic member positioned in register with the center hole in a recessed portion in the upper surface of the disc substrate so that the magnetic member substantially closes the center hole and an upper surface of the magnetic member is substantially flush with the upper surface of the disc substrate;

a cartridge for containing the disc substrate, the cartridge having access holes for one or more recording heads and the disc chucking device; and wherein the disc further includes an annular rib which depends from a lower surface of the disc substrate toward the disc chucking device for seating on the disc setting member and which enlarges the thickness of the disc substrate, in the direction of the axis of rotation of the spindle, around the periphery of the center hole, and wherein the thickness of the annular rib, in the direction of the axis of rotation of the spindle, is sufficient that when the disc substrate is supported by the annular rib on the disc setting member no part of the disc chucking device extends through the center hole of the disc substrate to project above an upper surface of the disc substrate which is parallel to the lower surface of the disc substrate; and wherein the disc chucking device further comprises a magnet mounted on the spindle, radially inwardly of the centering member for magnetically attracting the magnetic member.

2. The combination of a recording disc and a disc recording and reproducing apparatus as recited in claim 1, further comprising:

a coil spring mounted coaxially about the spindle for pressing the centering member away from the disc setting member and toward the magnetic member.

3. The combination of a recording disc and a disc recording and reproducing apparatus as recited in claim 1, wherein the centering member has a conical surface having a slope of at least 51° for contacting a lower, radially interior edge of the annular rib for coaxially centering the disc substrate about the spindle.

4. An optical recording medium comprising:

a single-piece disc-shaped transparent substrate having a first surface, a second surface parallel to the first surface, and a center hole formed at a center of the disc-shaped transparent substrate, with the center hole extending through the transparent substrate in a direction from the first surface to the second surface, the transparent substrate also having a recess portion formed in the first surface around the center hole and an annular rib projecting from the second surface around the center hole;

a recording layer formed on the first surface of the transparent substrate;

a magnetic member inserted into the recess portion of the transparent substrate, the magnetic member closing the center hole of the transparent substrate;

a cartridge body for containing the transparent substrate, the recording layer and the magnetic member, the cartridge body having a first cartridge surface opposite the first surface of the transparent substrate, the cartridge having a second cartridge surface opposite the second surface of the transparent substrate, with the second cartridge surface having a recording/reproducing aperture and having a central aperture with the annular rib projected therein; and said cartridge body further comprises a cartridge rib projecting from the second cartridge surface towards the second surface of the transparent substrate, and with the cartridge rib being formed around the central aperture, and with the cartridge rib being engagable with the annular rib.

* * * * *

UNITED STATES PATENT AND TRADEMARK OFFICE
CERTIFICATE OF CORRECTION

PATENT NO. : 6,252,842 B1
DATED : June 26, 2001
INVENTOR(S) : Hiroshi Mukawa

Page 1 of 1

It is certified that error appears in the above-identified patent and that said Letters Patent is hereby corrected as shown below:

<u>Column 7,</u>
Line 9, change ";" to -- , --.

<u>Column 8,</u>
Line 7, change "4,." to -- 4. --.

Signed and Sealed this

Twenty-sixth Day of February, 2002

Attest:

Attesting Officer

JAMES E. ROGAN
Director of the United States Patent and Trademark Office